United States Patent
Xu et al.

(10) Patent No.: US 8,495,214 B2
(45) Date of Patent: Jul. 23, 2013

(54) SYSTEM AND METHOD FOR CSCF ENTITY DISASTER TOLERANCE AND LOAD BALANCING

(75) Inventors: Xingmin Xu, Guangdong Province (CN); Hongfang Ai, Guangdong Province (CN); Jian Han, Guangdong Province (CN); Peng Ren, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 111 days.

(21) Appl. No.: 13/257,998

(22) PCT Filed: May 26, 2010

(86) PCT No.: PCT/CN2010/073254
§ 371 (c)(1),
(2), (4) Date: Dec. 7, 2011

(87) PCT Pub. No.: WO2010/145426
PCT Pub. Date: Dec. 23, 2010

(65) Prior Publication Data
US 2012/0198085 A1    Aug. 2, 2012

(30) Foreign Application Priority Data
Jun. 19, 2009   (CN) .......................... 2009 1 0108354

(51) Int. Cl.
*G06F 15/173*  (2006.01)

(52) U.S. Cl.
USPC ........................................ 709/225; 709/220

(58) Field of Classification Search
USPC ................... 709/220, 217; 370/230, 352, 349
See application file for complete search history.

(56) References Cited

U.S. PATENT DOCUMENTS

| | | | | |
|---|---|---|---|---|
| 5,790,548 | A | * | 8/1998 | Sistanizadeh et al. ........ 370/401 |
| 6,101,182 | A | * | 8/2000 | Sistanizadeh et al. ........ 370/352 |
| 6,452,925 | B1 | * | 9/2002 | Sistanizadeh et al. ........ 370/352 |
| 7,103,647 | B2 | * | 9/2006 | Aziz ............................ 709/220 |
| 7,693,959 | B2 | * | 4/2010 | Leighton et al. ............. 709/217 |
| 8,189,466 | B2 | * | 5/2012 | Mueller et al. ................ 370/230 |
| 2004/0146040 | A1 | * | 7/2004 | Phan-Anh et al. ........... 370/349 |

FOREIGN PATENT DOCUMENTS

| | | |
|---|---|---|
| CN | 101170553 A | 4/2008 |
| CN | 101616152 A | 12/2009 |

OTHER PUBLICATIONS

International Search Report for PCT/CN2010/073254 dated Jul. 29, 2010.

* cited by examiner

*Primary Examiner* — Tammy Nguyen
(74) *Attorney, Agent, or Firm* — Stephen Yang; Ling Wu; Ling and Yang Intellectual Property

(57) ABSTRACT

The present invention discloses a system and method for CSCF entity disaster tolerance and load balancing the system comprises P-CSCF entities, I-CSCF entities and S-CSCF entities, and further comprises a DNS Server. The present invention uses a DNS UPDATE message to report the load equivalent weight of the CSCF entity at regular time, so that the DNS Server can use the load equivalent weight when executing the load balancing strategy. It makes the disaster tolerance and load balancing in the IMS network be much easier to use and extend, thus reducing the load of the IMS network.

11 Claims, 5 Drawing Sheets

SYSTEM AND METHOD FOR CSCF ENTITY DISASTER TOLERANCE AND LOAD BALANCING

TECHNICAL FIELD

The present invention relates to the field of IP multimedia subsystem (IMS), and more particularly, to a system and method for call session control function (CSCF) entity disaster tolerance and load balancing.

BACKGROUND OF THE RELATED ART

As the call session control function entity in a IMS network, the operation reliability of the CSCF entity has great significance in the reliable operation of the entire IMS network. In order to guarantee the entire IMS network to operate reliably, ideas of network element availability detection and adjacent network element load balancing selection are provided in the conventional IMS. The idea of the network element availability detection introduces link detection mechanism into the IMS, and the link detection mechanism uses the method of session initiation protocol (SIP) OPTIONS to detect the availability of the link from the local network element to the adjacent network element. During a call connection, the local network element selects an available adjacent network element to offer services according to the availability of the link to the adjacent network element. The method is able to improve the success ratio of control plane signaling connection, thus improve the reliability of the whole network. According to the idea of the adjacent network element load balancing selection, a proxy CSCF (P-CSCF) entity, a serving CSCF (S-CSCF) entity and a breakout gateway control function (BGCF) entity in the IMS respectively apply the load balancing method to select an interrogation CSCF (I-CSCF) entity, a BGCF entity or a media gateway control function (MGCF) entity.

The local network architecture of the ideas of the network element availability detection and the adjacent network element load balancing selection used in the IMS is shown in FIG. 1, in alive period of the P-CSCF entity 101, the P-CSCF entity 101 sends a SIP OPTIONS signaling at a preset time interval to the I-CSCF entities 102 which connect with the P-CSCF entity 101, and if a response signaling from one I-CSCF entity 102 is not received in a preset time period and the number of not receiving the response signaling surpasses a preset numerical value, then that I-CSCF entity 102 is considered as unavailable. Once a register signaling of one user equipment (UE) 103 needs to be out, in the current available I-CSCF entity set obtained by the availability detection result the P-CSCF entity 101 selects a suitable I-CSCF entity according to the load balancing strategy, and routes the register signaling to the selected I-CSCF entity. Similar to the process of a P-CSCF entity selecting an I-CSCF, in the IMS the processes of a S-CSCF entity selecting a BGCF entity and a BGCF entity selecting a MGCF entity can also use the abovementioned method.

The abovementioned method has the following problems that:

a P-CSCF entity can detect the availability of I-CSCF entities, but the I-CSCF entities cannot detect the availability of a P-CSCF entity, that is, the detection is not bi-directional;

if there is a P-CSCF entity and/or an I-CSCF entity adding in the IMS network, the configuration of all entities in the IMS network has to be modified; and if in the IMS network the P-CSCF entity, the I-CSCF entity and the S-CSCF entity have a plurality of physical entities respectively, the load of the IMS network is increased due to a large number of SIP OPTIONS signalings for the network availability detection added in the network.

CONTENT OF THE INVENTION

The present invention provides a system and method for CSCF entity disaster tolerance and load balancing to make the usage and extension of the disaster tolerance and load balancing in the IMS network easier, thus to reduce the load of the IMS network.

The present invention discloses a system for CSCF entity disaster tolerance and load balancing, and the system comprises P-CSCF entities, I-CSCF entities and S-CSCF entities, and further comprises a domain name system server (DNS server), wherein, each P-CSCF entity or each I-CSCF entity is configured to: report its own load equivalent weight to said DNS Server via a DNS UPDATE message; when there is a SIP register signaling that needs to be out, send a DNS query signaling to said DNS Server, and route said SIP register signaling to the CSCF entity corresponding to a Service (SRV) record returned by the DNS Server;

each S-CSCF entity is configured to report its own load equivalent weight to said DNS Server via the DNS UPDATE message; and the DNS Server is configured to: offer a P-CSCF list, an I-CSCF list and a S-CSCF list, and adjust a position of each CSCF entity in the corresponding CSCF list according to the received DNS UPDATE message reported by the CSCF entity; and when receiving the DNS query signaling, return the SRV record corresponding to the target CSCF entity with minimum load equivalent weight in the corresponding CSCF list to the source CSCF entity.

In the present invention, the source CSCF entity is the entity that is now operating; and the target CSCF entity is the one that is operated.

Each P-CSCF entity, each I-CSCF entity or each S-CSCF entity is further configured to: collect its own load parameters in regular time, transfer the collected load parameters into the load equivalent weight, calculate an absolute value of the difference between the current load equivalent weight and the previous one, and compare said absolute value with a preset threshold; and if said absolute value is no less than said threshold, report the current load equivalent weight immediately; if said absolute value is less than said threshold, wait for a preset time period is time up and then report the latest load equivalent weight.

Each P-CSCF entity or each I-CSCF entity is further configured to: judge whether said SRV record carries an IP address of the corresponding CSCF entity when receiving the SRV record returned by said DNS Server; if said SRV record carries the IP address of the corresponding CSCF entity, directly send the SIP register signaling which needs to be out to said IP address carried in said SRV record; and if said SRV record does not carry the IP address of the corresponding CSCF entity, send a request signaling for acquiring the IP address of said CSCF entity to said DNS Server, and send the SIP register signaling which needs to be out to the IP address returned by said DNS Server.

Said DNS Server is further configured to: when receiving the DNS UPDATE message from one CSCF entity for the first time, start up a timer having a preset time length for said CSCF entity; when receiving the next DNS UPDATE message reported by said CSCF entity within the time length set in said timer, adjust the position of said CSCF entity in the corresponding CSCF list according to the load equivalent weight carried in said message, set the SRV record corresponding to said CSCF entity as available, and then restart up said timer; when not receiving the next DNS UPDATE message reported by said CSCF entity as the timer is overtime, set the SRV record corresponding to said CSCF entity as unavailable, and restart up said timer; and return an IP address of the corresponding CSCF entity when receiving a request for acquiring the IP address.

Said system further comprises a UE, and the UE is configured to: apply for a P-CSCF entity to the DNS Server by sending a request signaling for the SRV record of the P-CSCF entity; when receiving the SRV record returned by said DNS Server, judge whether said SRV record carries an IP address of the corresponding P-CSCF entity; if said SRV record carries the IP address of the corresponding P-CSCF entity, directly send the SIP register signaling to the IP address carried in said SRV record; and if said SRV record does not carry the IP address of the corresponding P-CSCF entity, send a request signaling for acquiring the IP address of said P-CSCF to the DNS Server, and send the SIP register signaling to the IP address returned by said DNS Server.

The present invention also discloses a method for CSCF entity disaster tolerance and load balancing, and said method comprises:

after a system is powered up, each CSCF entity reporting its own load equivalent weight to a DNS Server in regular time;

said DNS Server adjusting a corresponding CSCF list according to the received load equivalent weight;

when there is a SIP register signaling that needs to be out on a source CSCF entity, said source CSCF entity sending a DNS query signaling to the DNS Server;

said DNS Server returning to said source CSCF entity a SRV record of a target CSCF entity with the minimum load equivalent weight in the corresponding CSCF list according to the received DNS query signaling; and said source CSCF entity routing the SIP register signaling to the target CSCF entity corresponding to said SRV record.

Before said CSCF entity reports the load equivalent weight, it further performs the following operations:

said CSCF entity collecting its own load parameters in regular time and transferring the collected load parameters into the load equivalent weight, and then comparing a preset threshold with an absolute value of the difference between the current load equivalent weight and the previous one; and if said absolute value is no less than said threshold, said CSCF entity reporting the current load equivalent weight to the DNS Server immediately, and if said absolute value is less than said threshold, said CSCF entity reporting the latest load equivalent weight after a preset time period is time up. Wherein, Said load parameters comprise: the utilization rate of available CPU, the size of available memory, the size of available disk, and the communication capability of available network; and said preset time is one-twelfth of said preset time period.

Via a Weight field and/or Priority field in the SRV record carried in a DNS UPDATE message, said CSCF entity reports its own load equivalent weight to said DNS Server.

When said DNS Server receives the DNS UPDATE message reported by the CSCF entity, said DNS Server starts up a timer with a preset time length for each CSCF entity, and detects whether said DNS Server receives the next DNS UPDATE message reported by said CSCF entity before said timer is overtime; if said DNS Server receives the next DNS UPDATE message reported by said CSCF entity before said timer is overtime, said DNS Server adjusts a position of the CSCF entity in the corresponding CSCF list according to the load equivalent weight carried in said message, sets the SRV record corresponding to said CSCF entity as available and restarts up said timer; and if said DNS Server does not receive the next DNS UPDATE message reported by said CSCF entity before said timer is overtime, said DNS Server sets the SRV record corresponding to said CSCF entity as unavailable, and restarts up said timer.

If said source CSCF entity is a P-CSCF entity, said target CSCF entity is an I-CSCF entity, and if said source CSCF entity is an I-CSCF entity, said target CSCF entity is a P-CSCF entity.

When a UE registers to the system, the UE firstly applies for a P-CSCF entity to the DNS Server; after the DNS Server receives the request signaling from the UE, the DNS Server returns the SRV record corresponding to the P-CSCF entity with the minimum load equivalent weight in a P-CSCF list to said UE; and said UE sends the SIP register signaling to the P-CSCF entity corresponding to the received SRV record.

The present invention uses the DNS UPDATE message to report the load equivalent weights of the CSCF entities in regular time so that the load equivalent weights can be used by the DNS Server when performing the load balancing strategy. With the present invention, when adding CSCF entities in the IMS network, it only needs to configure a load equivalent weight report mechanism to the added entities, but not affecting the operations of other entities in the original network, Moreover, the DNS Server is responsible for the load management of the CSCF entities in the whole network, and no interaction between the CSCF entities is needed, thus reducing the number of SIP OPTIONS signalings in the IMS network and also reducing the network load.

PREFERRED EMBODIMENTS OF THE PRESENT INVENTION

The present invention will be illustrated in more detail with combination of the accompanying drawings and preferred embodiments.

Figure 1:
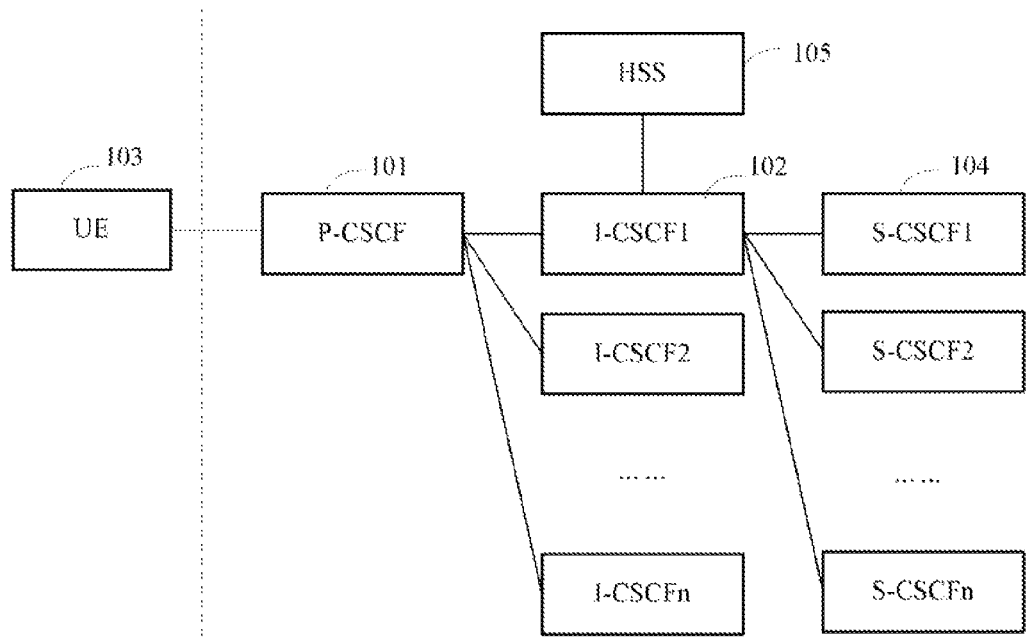
FIG. 1 is a schematic diagram of a system architecture of detection and load balancing selection in the prior art.
Figure 2:
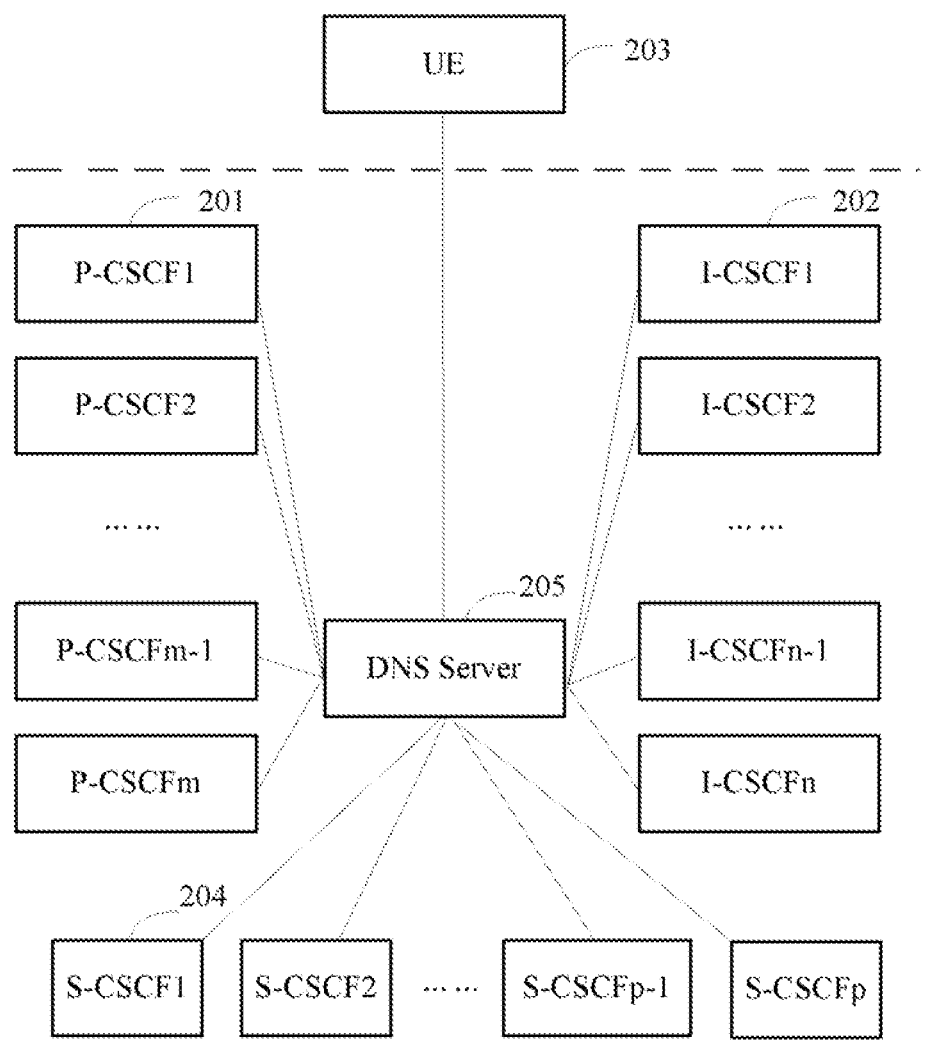
FIG. 2 is a schematic diagram of a structure of a system in accordance with an embodiment of the present invention.

FIG. 2 is a schematic diagram of a structure of a system in accordance with an embodiment of the present invention, and the system comprises P-CSCF entities 201, I-CSCF entities 202, S-CSCF entities 204, a UE 203 and a DNS Server 205. In the present embodiment, it is supposed that the number of the P-CSCF entities is m, the number of the I-CSCF entities is n and the number of the S-CSCF entities is p.

Each P-CSCF entity 201 and each I-CSCF entity 202 are configured to: collect its own load parameters in regular time, transfer the load parameters into a load equivalent weight, calculate an absolute value of the difference between the current load equivalent weight and the previous one, and compare the absolute value with a preset threshold; and if the absolute value is no less than the threshold, report the current load equivalent weight via a DNS UPDATE message, otherwise, report the latest load equivalent weight via the DNS UPDATE message when the preset time period is time up; and also configured to: when there is a SIP register signaling needs to be out, send a DNS query signaling to the DNS Server 205, and when receiving a SRV record returned by the DNS Server 205, judge whether the SRV record carries an IP address of the corresponding CSCF entity; and if yes, directly send the SIP register signaling that needs to be out to the IP address carried in the SRV record, otherwise, send to the DNS Server a request signaling for the IP address of the CSCF entity and send the SIP register signaling that needs to be out to the IP address returned by the DNS server 205.

Each S-CSCF entity 204 is configured to: collect its own load parameters in regular time, transfer the load parameters into a load equivalent weight, calculate an absolute value of the difference between the current load equivalent weight and the previous one, and compare the absolute value with a preset threshold; and if the absolute value is no less than the threshold, report the current load equivalent weight via a DNS UPDATE message, otherwise, report the latest load equivalent weight via the DNS UPDATE message when the preset time period is time up.

The UE 203 is configured to: apply to the DNS Server 205 for a P-CSCF entity by sending a request signaling for the SRV record of the P-CSCF entity, and judge whether an SRV record carries an IP address of the corresponding P-CSCF entity when receiving the SRV record returned by the DNS Server 205; and if yes, directly send the SIP register signaling to the IP address carried in the SRV record, otherwise, send a request signaling for the IP address of the P-CSCF entity to the DNS Server 205 and send the SIP register signaling to the IP address returned by the DNS Server 205.

The DNS Server 205 is configured to: offer a P-CSCF list, a I-CSCF list and a S-CSCF list; when receiving a DNS UPDATE from one CSCF entity for the first time, start up a timer with a preset time period for the CSCF entity; when receiving the next DNS UPDATE message reported by the CSCF entity during the preset time period of the timer, adjust the position of the CSCF entity in the corresponding CSCF list according to the load equivalent weight carried in the message, set the SRV record corresponding to the CSCF entity as available, and then restart up the timer; and when still not receiving the next DNS UPDATE message reported by the CSCF entity as the timer is overtime, set the SRV record corresponding to the CSCF entity as unavailable and restart up the timer; and also configured to: when receiving a request for acquiring the IP address, return the IP address of the corresponding CSCF entity, and when receiving a DNS query signaling, return the SRV record corresponding to the target CSCF entity with the minimum load equivalent weight in the corresponding CSCF list to the source CSCF entity.

The DNS Server 205 saves the SRV records of the same kind of entities into the same list, that is, the SRV records of the m P-CSCF entities are saved in the P-CSCF list, the SRV records of the n I-CSCF entities are saved in the I-CSCF list, and the SRV records of the p S-CSCF entities are saved in the S-CSCF list. The same kind of entities are ordered according to their load equivalent weights so as to be used in the load balancing strategy.

Figure 3:
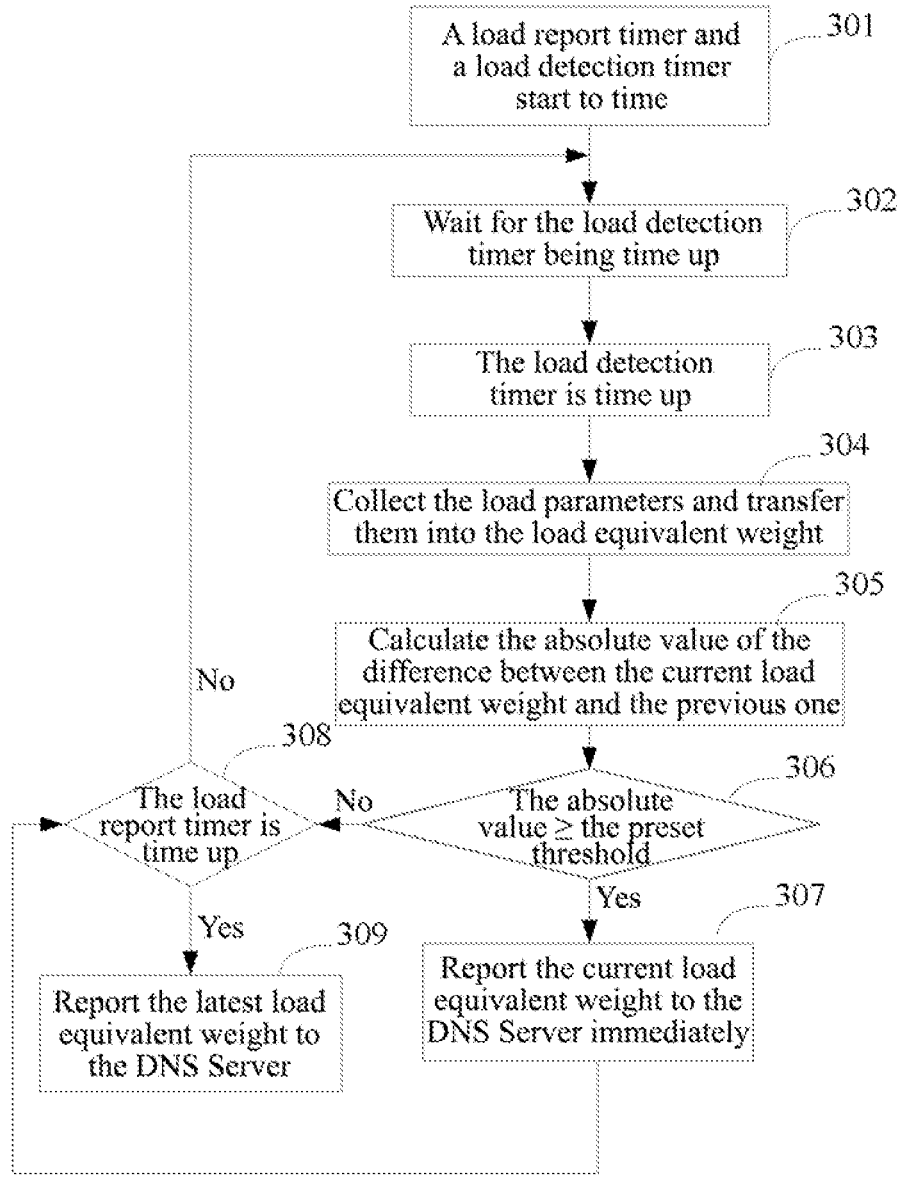
FIG. 3 is a flow chart of a method for each CSCF entity reporting load equivalent weight in accordance with an embodiment of the present invention.

FIG. 3 is a flow chart of a method for each CSCF entity reporting load equivalent weight in accordance with an embodiment of the present invention. In the present embodiment, it is supposed that the preset time period of the CSCF entity is 60 s. The procedure specifically comprises the following steps:

step 301, after the system is powered up, a load report timer and a load detection timer of each CSCF entity start to time;

In the present embodiment, the timing length of the load report timer equals to the preset time period which is 60 s; and the timing length of the load detection timer is one-twelfth of the preset time period, that is, 60/12=5 s, that is, the CSCF entity collects the load parameters and transfers them into the load equivalent weight every 5 s;

step 302, the CSCF entity waits for its own load detection timer being time up;

step 303, the load detection timer is time up; and proceed to step 304;

step 304, collect its own load parameters and transfer them to the load equivalent weight;

the load parameters comprise: the usage rate of available CPU, the size of available memory, the size of available disk, and the communication capability of available network;

step 305, calculate the absolute value of the difference between the current load equivalent weight and the previous one;

if the current load equivalent weight is the first load equivalent weight, the previous load equivalent weight in this step is 0;

step 306, compare the absolute value acquired in step 305 with the preset threshold; if the absolute value is no less than the threshold, proceed to step 307; otherwise proceed to step 308;

the threshold can be adjusted according to the calculated absolute value;

step 307, report the current load equivalent weight to the DNS Server via the Weight field and/or the Priority field in the SRV record carried in the DNS UPDATE message;

step 308, judge whether the load report timer is time up, and if yes, proceed to step 309, otherwise, proceed to step 302;

step 309, report the latest load equivalent weight to the DNS Server via the Weight field and/or Priority field in the SRV record carried in the DNS UPDATE message.

Figure 4:
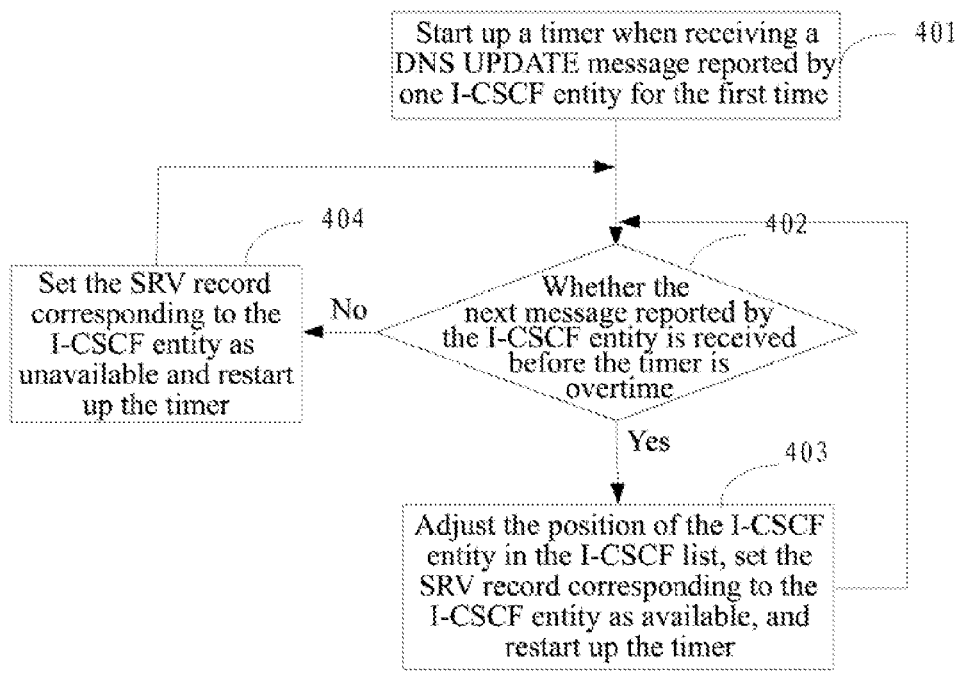
FIG. 4 is a flow chart of a procedure performed by a DNS Server when receiving a DNS UPDATE message reported by an I-CSCF in accordance with an embodiment of the present invention.

FIG. 4 is a flow chart of a procedure performed by a DNS Server when receiving a DNS UPDATE message reported by an I-CSCF in accordance with an embodiment of the present invention. The present embodiment takes the I-CSCF entities as example, and for the P-CSCF entities and the S-CSCF entities, the procedure is the same. The procedure specifically comprises the following steps:

step 401, after the DNS Server receives a DNS UPDATE message from the I-CSCF entity n for the first time, it starts up a timer with preset time length for the I-CSCF entity n;

step 402, detect whether it receives the next DNS UPDATE message reported by the I-CSCF entity n before the timer is overtime, and if yes, proceed to step 403; otherwise, proceed to step 404;

step 403, adjust the position of the I-CSCF entity n in the I-CSCF list according to the size of the load equivalent weight carried in the SRV record in the received DNS UPDATE message, set the SRV record corresponding to the I-CSCF entity n in the I-CSCF list as available, and restart up the timer at the same time to wait for the next DNS UPDATE message;

in the present embodiment, each CSCF entity is ordered in its CSCF list according to its load equivalent weight;

step 404, set the SRV record corresponding to the I-CSCF entity n in the I-CSCF list as unavailable, and restart up the timer to wait for the next DNS UPDATE message.

Figure 5:
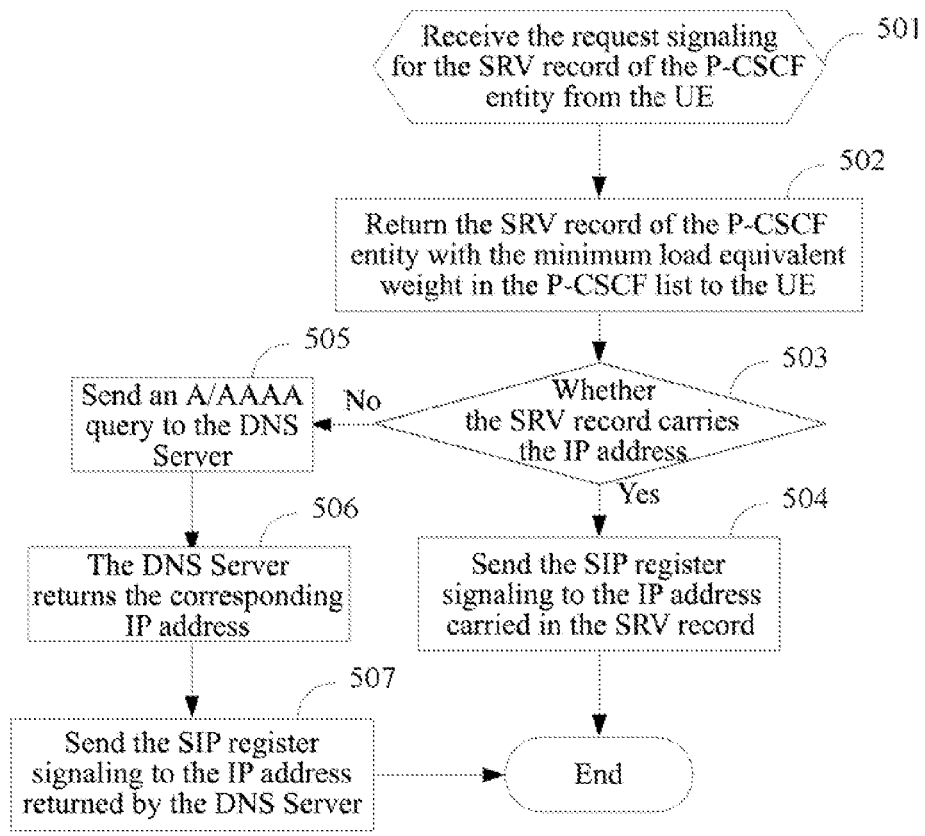
FIG. 5 is a flow chart of a procedure performed by a DNS Server when receiving from a UE a request signaling for service (SRV) record of a P-CSCF entity in accordance with an embodiment of the method of the present invention.

FIG. 5 is a flow chart of a procedure performed by a DNS Server when receiving from a UE a request signaling for SRV record of a P-CSCF entity in accordance with an embodiment of the method of the present invention, and the procedure specifically comprises the following steps:

step 501, the DNS Server receives the request signaling for the SRV record of one P-CSCF entity from the UE;

step 502, the DNS Server returns the SRV record corresponding to the P-CSCF entity with the minimum load equivalent weight in the P-CSCF list to the UE;

step 503, the UE judges whether the received SRV record carries the IP address of the corresponding P-CSCF entity, and if yes, proceed to step 504; otherwise, proceed to step 505;

step 504, the UE sends the SIP register signaling to the IP address carried in the SRV record, and the processing for the request is completed;

step 505, send an A/AAAA query to the DNS Server to request for acquiring the IP address of the P-CSCF entity;

Step 506: after the DNS Server receives the A/AAAA query, it searches out and returns the IP address of the P-CSCF entity to the UE;

Step 507: after the UE receives the IP address returned by the DNS Server, it sends the SIP register signaling to the IP address, and the processing for the request is completed.

Figure 6:
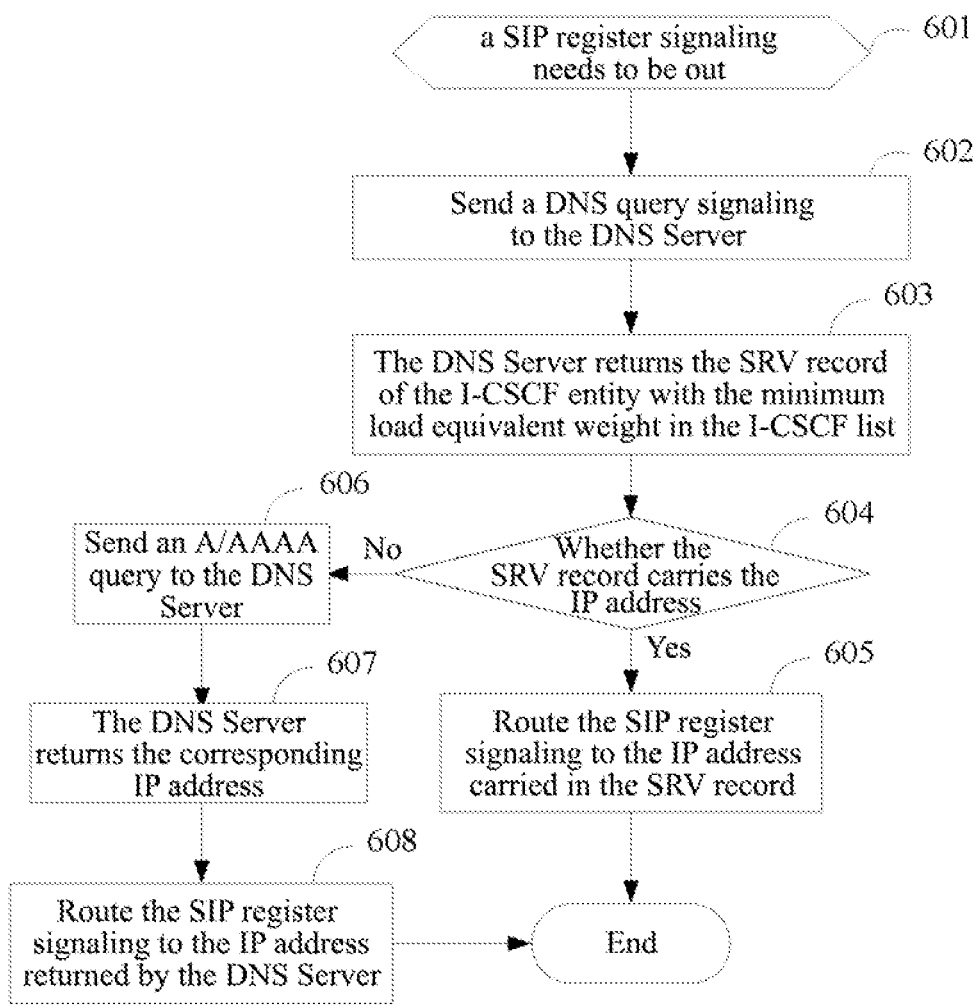
FIG. 6 is a flow chart of a procedure performed by a P-CSCF entity when processing a SIP register signaling that needs to be out in accordance with an embodiment of the method of the present invention.

FIG. 6 is a flow chart of a procedure performed by a P-CSCF entity when processing a SIP register signaling that needs to be out in accordance with an embodiment of the method of the present invention. The present embodiment is illustrated by taking the P-CSCF entity being the source CSCF entity and the I-CSCF entity being the target CSCF entity for example, and when the source CSCF entity is the I-CSCF entity, the procedure is similar with the above. The procedure specifically comprises the following steps:

step 601, a SIP register signaling on the P-CSCF needs to be out;

step 602, send a DNS query signaling to the DNS Server;

step 603, the DNS Server returns the SRV record corresponding to the I-CSCF entity with the minimum load equivalent weight in the I-CSCF list to the P-CSCF entity;

step 604, after the P-CSCF entity receives the SRV record, it judges whether the SRV record carries the IP address of the corresponding I-CSCF entity, and if yes, proceed to step 605; otherwise, proceed to step 606;

step 605, route the SIP register signaling to the IP address, and the processing for that SIP register signaling is completed;

step 606, send an A/AAAA query to the DNS Server to request for acquiring the IP address of the I-CSCF entity;

step 607, after the DNS Server receives the A/AAAA query, it searches out and returns the IP address of the I-CSCF entity to the P-CSCF entity;

step 608, after the P-CSCF entity receives the IP address returned by the DNS Server, it routes the SIP register signaling to the IP address, and the processing for that SIP register signaling is completed.

The above description is only preferred embodiments of the present invention, for those skilled in the art, the present invention can have a variety of modification or variations. Without departing from the spirit and essence of the present invention, any of modification, equivalents or variations can be made within the scope of the appending claims of the present invention.

INDUSTRIAL APPLICABILITY

In the system and method for CSCF entity disaster tolerance and load balancing in accordance with the present invention, the DNS UPDATE message is used to report the load equivalent weights of the CSCF entities in regular time so that the load equivalent weights can be used by the DNS Server when performing the load balancing strategy. Therefore, when adding CSCF entities in the IMS network, it only needs to configure a load equivalent weight report mechanism to the added entities, but not affecting the operations of other entities in the original network. Moreover, the DNS Server is responsible for the load management of the CSCF entities in the whole network, and no interaction between the CSCF entities is needed, thus reducing the number of SIP OPTIONS signalings in the IMS network and also reducing the network load.

What is claimed is:

1. A system for call session control function entity disaster tolerance and load balancing, comprising proxy call session control function entities, interrogation call session control function entities, serving call session control function entities, and further comprising a domain name system server, wherein, each proxy call session control function entity or each interrogation call session control function entity is configured to: report its own load equivalent weight to said domain name system server via a DNS UPDATE message; when there is a session initiation protocol register signaling that needs to be out, send a domain name system query signaling to said domain name system server, and route said session initiation protocol register signaling to the call session control function entity corresponding to a service record returned by the domain name system server;

each serving call session control function entity is configured to report its own load equivalent weight to said domain name system server via the DNS UPDATE message; and the domain name system server is configured to: offer a proxy call session control function list, an interrogation call session control function list and a serving call session control function list, and adjust a position of each call session control function entity in the corresponding call session control function list according to the received DNS UPDATE message reported by the call session control function entity; and when receiving the domain name system query signaling, return the service record corresponding to the target call session control function entity with minimum load equivalent weight in the corresponding call session control function list to the source call session control function entity.

2. The system of claim 1, wherein, each proxy call session control function entity, each interrogation call session control function entity or each serving call session control function entity is further configured to: collect its own load parameters in regular time, transfer the collected load parameters into the load equivalent weight, calculate an absolute value of the difference between the current load equivalent weight and the previous one, and compare said absolute value with a preset threshold; and if said absolute value is no less than said threshold, report the current load equivalent weight immediately, if said absolute value is less than said threshold, wait for a preset time period is time up and then report the latest load equivalent weight.

3. The system of claim 1, wherein, each proxy call session control function entity or each interrogation call session control function entity is further configured to: judge whether said service record carries an internet protocol address of the corresponding call session control function entity when receiving the service record returned by said domain name system server; if said service record carries the internet protocol address of the corresponding call session control function entity, directly send the session initiation protocol register signaling which needs to be out to said internet protocol address carried in said service record; and if said service record does not carry the internet protocol address of the corresponding call session control function entity, send a request signaling for acquiring the internet protocol address of said call session control function entity to said domain name system server, and send the session initiation protocol register signaling which needs to be out to the internet protocol address returned by said domain name system server.

4. The system of claim 1, wherein, said domain name system server is further configured to: when receiving the DNS UPDATE message from one call session control function entity for the first time, start up a timer having a preset time length for said call session control function entity; when receiving the next DNS UPDATE message reported by said call session control function entity within the timing length set in said timer, adjust the position of said call session control function entity in the corresponding call session control function list according to the load equivalent weight carried in said message, set the service record corresponding to said call session control function entity as available, and then restart up said timer; when not receiving the next DNS UPDATE message reported by said call session control function entity as the timer is overtime, set the service record corresponding to said call session control function entity as unavailable, and restart up said timer; and return an internet protocol address of the corresponding call session control function entity when receiving a request for acquiring the internet protocol address.

5. The system of claim 1, further comprising:

a user equipment, configured to: apply for a proxy call session control function entity to the domain name system server by sending a request signaling for the service record of the proxy call session control function entity; when receiving the service record returned by said domain name system server, judge whether said service record carries an internet protocol address of the corresponding proxy call session control function entity; if said service record carries the internet protocol address of the corresponding proxy call session control function entity, directly send the session initiation protocol register signaling to the internet protocol address carried in said service record; and if said service record does not carry the internet protocol address of the corresponding proxy call session control function entity, send a request signaling for acquiring the internet protocol address of said proxy call session control function entity to the domain name system server, and send the session initiation protocol register signaling to the internet protocol address returned by said domain name system server.

6. A method for call session control function entity disaster tolerance and load balancing, comprising:

after a system is powered up, each call session control function entity reporting its own load equivalent weight to a domain name system server in regular time;

said domain name system server adjusting a corresponding call session control function list according to the received load equivalent weight;

when there is a session initiation protocol register signaling that needs to be out on a source call session control function entity, said source call session control function entity sending a domain name system query signaling to the domain name system serve;

said domain name system server returning to said source call session control function entity a service record of a target call session control function entity with the minimum load equivalent weight in the corresponding call session control function list according to the received domain name system query signaling; and said source call session control function entity routing the session initiation protocol register signaling to the target call session control function entity corresponding to said service record.

7. The method of claim 6, wherein, before said call session control function entity reports the load equivalent weight, the method further comprises:

said call session control function entity collecting its own load parameters in regular time and transferring the collected load parameters into the load equivalent weight, and then comparing a preset threshold with an absolute value of the difference between the current load equivalent weight and the previous one; and if said absolute value is no less than said threshold, said call session control function entity reporting the current load equivalent weight to the domain name system server immediately, and if said absolute value is less than said threshold, said call session control function entity reporting the latest load equivalent weight after a preset time period is time up.

8. The method of claim 6, wherein, said call session control function entity reports its own load equivalent weight to said domain name system server via a Weight field and/or a Priority field in the service record carried in a DNS UPDATE message.

9. The method of claim 8, further comprising:

when said domain name system server receives the DNS UPDATE message reported by the call session control function entity, said domain name system server starting up a timer with a preset time length for each call session control function entity, and detecting whether said domain name system server receives the next DNS UPDATE message reported by said call session control function entity before said timer is overtime; if said domain name system server receives the next DNS UPDATE message reported by said call session control function entity before said timer is overtime, adjusting a position of the call session control function entity in the corresponding call session control function list according to the load equivalent weight carried in said message, setting the service record corresponding to said call session control function entity as available, and restarting up said timer; and if said domain name system server does not receive the next DNS UPDATE message reported by said call session control function entity before said timer is overtime, setting the service record corresponding to said call session control function entity as unavailable, and restarting up said timer.

10. The method of claim 6, wherein, if said source call session control function entity is a proxy call session control function entity, said target call session control function entity is an interrogation call session control function entity; and if said source call session control function entity is an interrogation call session control function entity, said target call session control function entity is a proxy call session control function entity.

11. The method of claim 6, further comprising:

when a user equipment registers to the system, the user equipment firstly applying for a proxy call session control function entity to the domain name system server;

after the domain name system server receives the request signaling from the user equipment, the domain name system server returning the service record corresponding to the proxy call session control function entity with the minimum load equivalent weight in a proxy call session control function list to said user equipment; and said user equipment sending the session initiation protocol register signaling to the proxy call session control function entity corresponding to the received service record.

\* \* \* \* \*